G. L. LASLEY.
SELF PITCHER AND FEEDER.
APPLICATION FILED JULY 19, 1911.
1,055,977.
Patented Mar. 11, 1913.
3 SHEETS—SHEET 1.
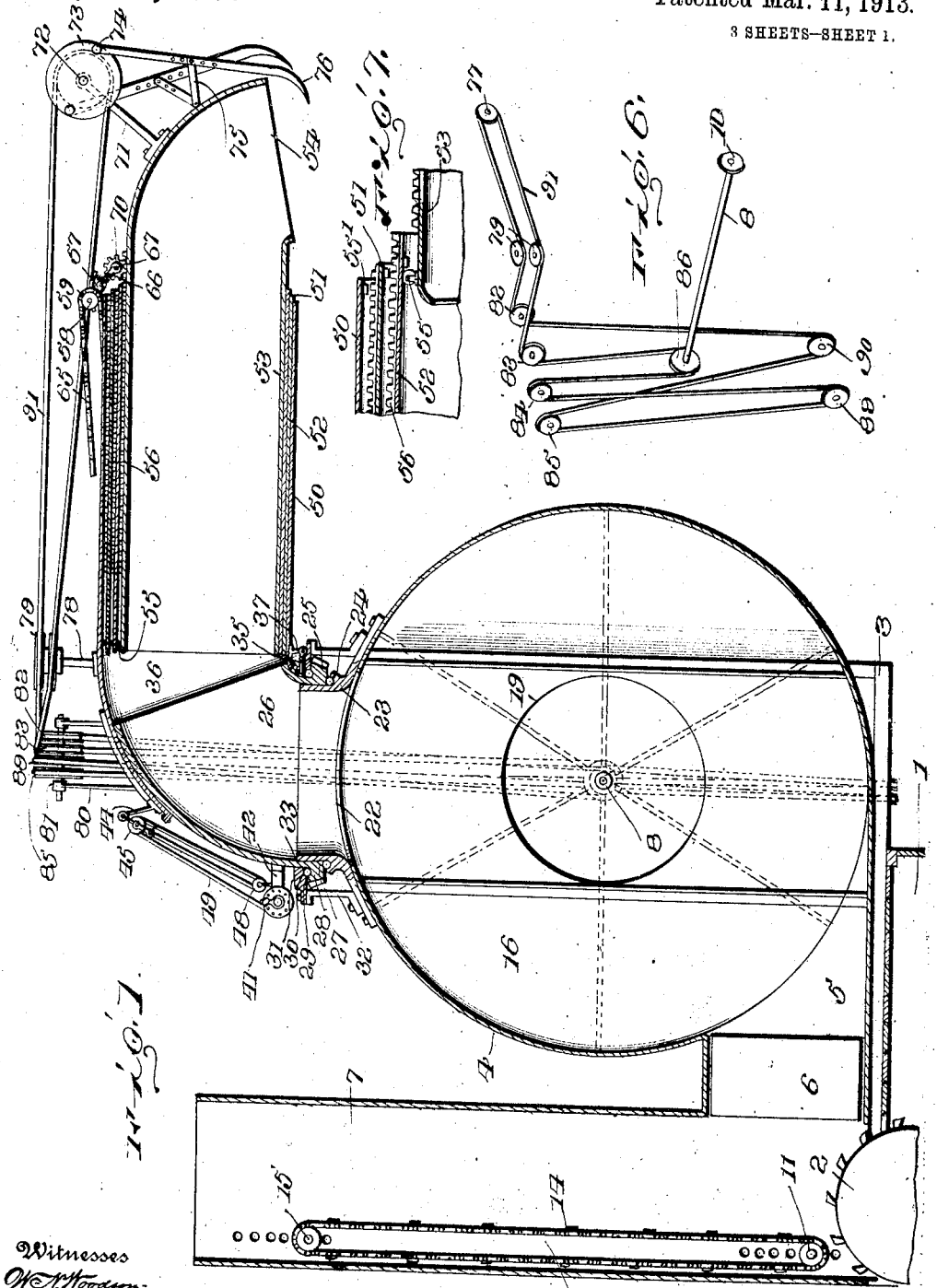
Witnesses
W. N. Woodson
Juana M. Fallin
Inventor
G. L. Lasley
By Stacey, Attorneys.

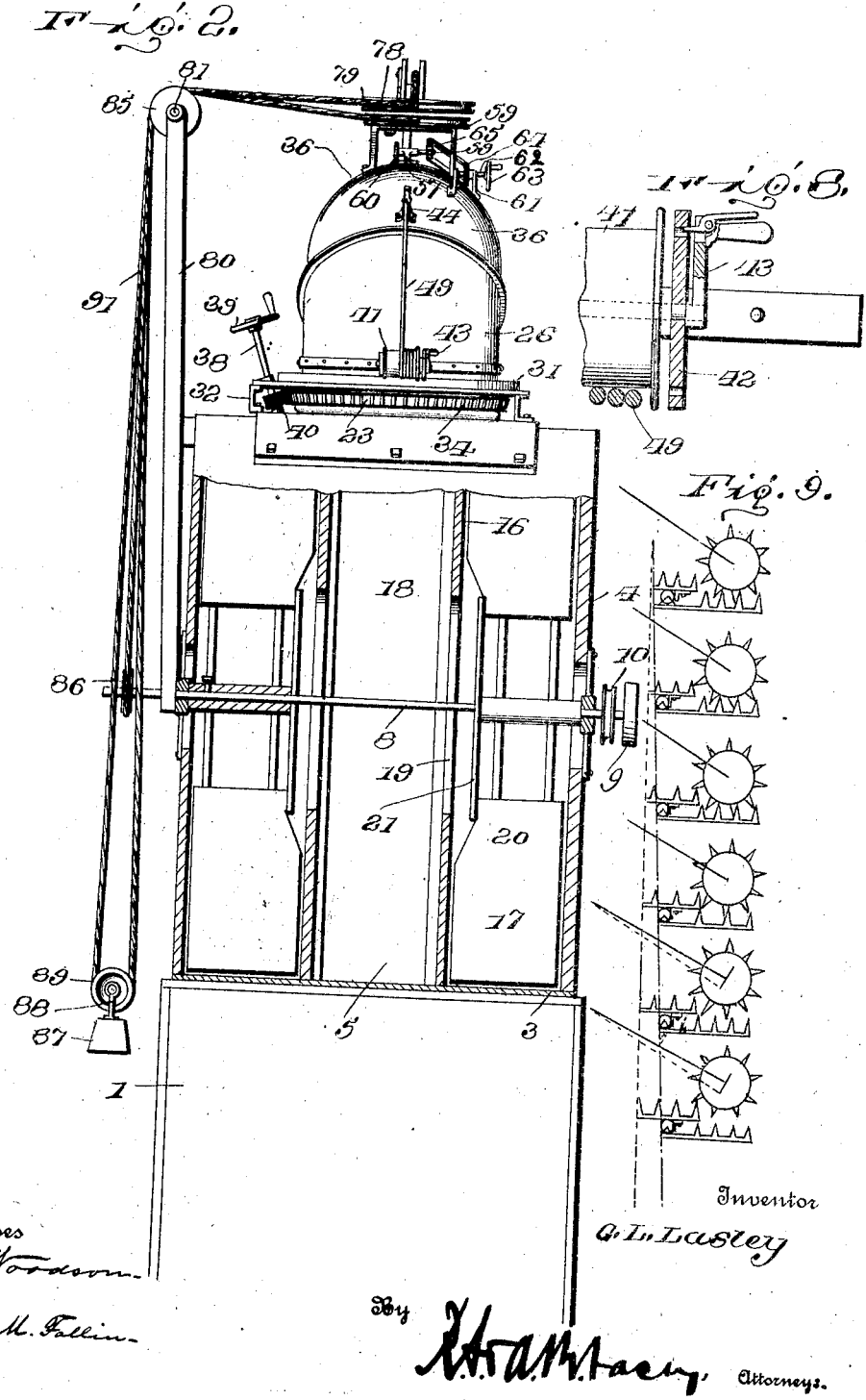

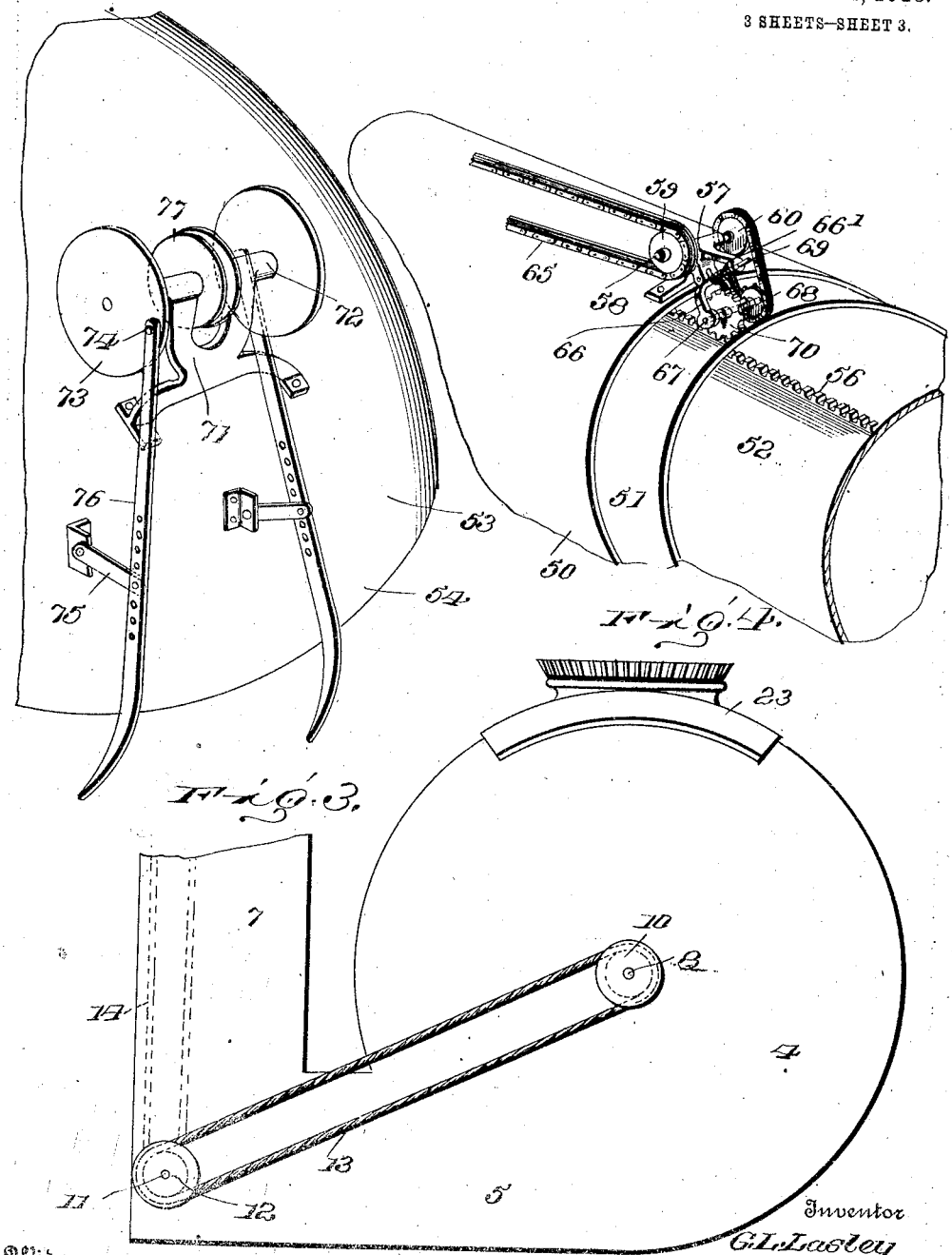

UNITED STATES PATENT OFFICE.

GUFF LOGIN LASLEY, OF EDITH, KANSAS.

SELF PITCHER AND FEEDER.

1,055,977.  Specification of Letters Patent.  Patented Mar. 11, 1913.

Application filed July 19, 1911. Serial No. 639,387.

*To all whom it may concern:*

Be it known that I, GUFF L. LASLEY, a citizen of the United States, residing at Edith, in the county of Logan and State of Kansas, have invented certain new and useful Improvements in Self Pitchers and Feeders, of which the following is a specification.

This invention has relation to self pitchers and feeders for threshers or grain separators, and has for its object to provide such a device in the form of an attachment which may be easily and quickly applied to the frame of a thresher or separator and having its parts so arranged that they may be easily and quickly collapsed or folded so that the attachment will not present obstruction when the machine to which it is applied is transported from place to place.

With this object in view the feeder includes a fan casing in which binary fans are mounted for rotation with a straw passageway between them. The said fan casing is arranged to discharge into a distributing mechanism which is positioned at or about the cylinder of a thresher or separator. An extensible pipe is connected with the receiving end of the fan casing and is provided at the outer end of its outermost section with a series of forks arranged for swinging or pivotal movement and which are adapted to engage the straw as it lies upon a stack and direct the same toward the receiving end of the outermost pipe section. Means is provided for extending the pipe sections at will and means is provided for swinging the pipe horizontally in order that the receiving end of the outermost section may be positioned over any desired part of the stack. The fans create suction draft through the extensible pipe, whereby the straw is conveyed to the fan casing and is permitted to gravitate through the same, and the fans create blast draft through the outlet of their casing, whereby the straw is conveyed to the distributer and the blast of air is permitted to escape from the same without being passed into the body of the thresher or separator.

In the accompanying drawings:—Figure 1 is a longitudinal sectional view of the feeder; Fig. 2 is a transverse sectional view of the same; Fig. 3 is a perspective view of forks used upon the feeder; Fig. 4 is a perspective view of means for moving the pipe sections of the feeder longitudinally; Fig. 5 is a side elevation of a part of the feeder; Fig. 6 is a diagrammatic perspective view showing the arrangement of a continuous rope belt used upon the feeder; Fig. 7 is an enlarged sectional view of portions of pipes used upon the feeder; Fig. 8 is a detail view of parts of a holding device used upon the feeder. Fig. 9 is a diagrammatic view showing how the operating pinion passes from one section of the extensible tube to a succeeding section thereof.

Corresponding and like parts are referred to in the following description and indicated in all the views of the accompanying drawings by the same reference characters.

As illustrated in the accompanying drawings, 1 indicates the grain receiving end of a thresher or separator at which is located a cylinder 2 in the usual manner. The frame 3 of the feeder attachment is mounted upon the receiving end portion of the said thresher or separator and supports a fan housing 4. This housing is provided with a discharge outlet 5 which is provided at its sides with adjustable sections 6. The end portions of the sections remote from the outlet of the fan housing may be moved toward or away from each other and secured in adjusted positions in order to accommodate between them the quantity of grain which is being passed through the feeder into the thresher or separator. Any suitable means may be employed for accomplishing this adjustment and for securing the parts in adjusted positions.

A vertically disposed flue 7 is connected at its lower end with the discharge outlet 5 of the fan casing 4 and constitutes a wind escape. The said flue is open at its upper end. The end of the discharge outlet 5 of the fan housing 4 is located adjacent the upper portion of the periphery of the cylinder 2 of the thresher or separator. A shaft 8 extends transversely across the fan housing 4 and is journaled in the sides thereof and is provided at one end portion with a belt pulley 9 around which a belt may be passed from any operating part of the machine for operating the feeder. A pulley 10 is also fixed to the shaft 8 and a shaft 11 is journaled at the lower end portion of the flue 7 at a point behind a vertical plane passing through the axis of the cylinder 2. A pulley 12 is fixed to the shaft 11 and a belt 13 is trained around the pulleys 10 and 12 and is adapted to transmit rotary movement from the shaft 8 to the shaft 11. The shaft 11 is adjustably positioned in the lower portion of the flue 7, and the lower portion of an endless distributer 14 is trained around the shaft 11. The said distributer extends up into the flue 7 along that side thereof which is remote from the fan housing 4 and is trained at its upper portion around a shaft 15 journaled in the upper portion of the said flue. The shaft 15 is also adjustably mounted and may be shifted in its position longitudinally of the flue 7.

The parts are so arranged that the inner run of the distributer 14 moves in a downward direction toward the periphery of the cylinder 2 and the said distributer may be positioned with relation to the cylinder to operate upon the grain when it is introduced to the cylinder in large or small quantities.

Partitions 16 divide the interior of the fan housing 4 into side compartments 17 in which the fans, hereinafter to be described, are located, and an intermediate straw passage 18 the lower end of which communicates with the discharge outlet 5 of the said casing. The partitions 16 are provided with central openings 19. Fans 20 are mounted upon the shaft 8 and are located within the compartments 17 and are provided at their centers with hub plates 21 which are approximately of the same diameter as the openings 19 in the partitions 16 and which are spaced in vertical planes from the said partitions. The fan housing 4 is provided with an inlet opening 22 and an annular bracket 23 in the form of a casting is positioned upon the top portion of the fan housing 4 and surrounds the inlet opening 22 thereof. This bracket 23 is provided with a ball race 24 which receives bearing balls 25. An elbow member 26 is provided at its lower end with a ball race 27 which receives the upper portions of the balls 25, the said elbow member surrounding the upper portion of the bracket 23. The elbow member 26 is provided with an outstanding annular flange 28 which is provided upon its upper side with a ball race 29 which holds bearing balls 30. A ring 31 is supported upon standards 32 which in turn are fixed to the intermediate portion of the bracket 23 and the said ring is provided upon its under side with a ball race 33 which receives the upper portions of the bearing balls 30. The flange 28 is provided at its outer edge with gear teeth 34. An arm 35 is fixed to the elbow 26 and an elbow member 36 is slidably mounted upon the upper portion of the elbow member 26 and is provided with an arm 37 which is pivotally connected at its lower end with the outer end of the arm 35. Therefore it will be seen that provision is made whereby the elbow members 26 and 36 may move longitudinally with relation to each other and the elbow member 26 is so mounted that it may be revolved and will in turn swing the parts mounted thereon.

Any suitable means may be provided for turning the elbow member 26, but that shown in the drawings consists of a shaft 38 journaled upon the bracket 23 and having at its upper end a hand wheel 39. At an intermediate point the shaft 38 carries a pinion 40 which meshes with the teeth 34 at the periphery of the flange 28. Therefore it will be seen that by rotating the shaft 38 the said flange and its attached parts will be rotated through the instrumentality of the pinion 40 and the intermeshing gear teeth 34 carried by the said flange.

Any suitable means may be provided for moving the elbow member 36 longitudinally with relation to the elbow member 26, but that shown in the drawings consists of a drum 41 journaled at the ends of braces or supports 42 mounted upon the lower end portion of the elbow member 26. An operating hand wheel 43 is fixed to the shaft of the drum 41. A bracket 44 is mounted upon the elbow member 36 and carries a block 45 in which is journaled pulleys 46 and 47. A pulley block 48 is attached to the outer end portions of the braces 42. A cable 49 is attached at one end to the pulley block 48 and is then carried forward and trained around the pulley 47, from whence it is carried back and trained around the pulley block 48, and from thence it is carried forward and trained around the pulley 46 from which pulley it extends to the drum 41 and is arranged to wind upon the same. Therefore it will be seen that by turning the drum through the instrumentality of the hand wheel 43 the said cable may be wound upon or unwound from the said drum, whereby the elbow member 36 may swing or move longitudinally with relation to the elbow member 26.

An outer pipe section 50 is fixed at one end to the elbow member 36 and pipe sections 51, 52 and 53 are arranged to slide telescopically within the pipe section 50. The pipe section 53 is provided at its outer end and in one side with an inlet opening 54. The pipe sections 51, 52 and 53 are provided at their inner ends with upstanding rollers 55. The roller 55 upon the innermost pipe section bears against the inner side of the next adjacent or next outermost section and this arrangement is preserved throughout the series of pipe sections. The pipe sections 51, 52 and 53 are provided upon their top sides each with a set of gear teeth 56, and the pipe sections 50, 51 and 52 are provided upon their inner sides with stops 55' against which the rollers 55 engage to start the longitudinal movement of the sections.

A bracket 57 is mounted upon the top of the outer portion of the pipe section 50 and a shaft 58 is journaled therein. A sprocket wheel 59 is fixed to one end of the said shaft and a sprocket wheel 60 is fixed to the other end of the said shaft. A bracket 61 is mounted upon the elbow member 36 and a shaft 62 is journaled therein. A handle wheel 63 is fixed to the shaft 62 as is also a sprocket wheel 64. A sprocket chain 65 is trained around the sprocket wheels 59 and 64 and is adapted to transmit rotary movement from the shaft 62 to the shaft 58. A yoke 66 is pivotally supported by the bracket 57 and a shaft 67 is journaled in the lower portion of the said yoke. A spring 66' is interposed between the yoke 66 and bracket 57 and holds the yoke in depressed position. A sprocket wheel 68 is fixed to one end portion of the shaft 67 and a sprocket chain 69 is trained around the sprocket wheels 60 and 68 and is adapted to transmit rotary movement from the shaft 58 to the shaft 67. A gear wheel 70 is fixed to the intermediate portion of the shaft 67 and is adapted to mesh with the gear teeth 56 of the pipe sections 51, 52 and 53 as the said pipe sections move under the said gear wheel. Therefore it will be seen that by turning the shaft 62 the chain 65 will operate the shaft 58 which in turn through its connecting parts will operate the shaft 67, whereby the gear wheel 70 will move the pipe sections 51, 52 and 53 longitudinally so that the pipe of which the said sections form components may be extended or contracted longitudinally.

A bracket 71 is mounted upon the upper side of the receiving end of the innermost pipe section 53 and a shaft 72 is journaled for rotation in the said bracket. Disks 73 are fixed to the end portions of the shaft 72 and are provided with outstanding pins 74. Links 75 are pivotally connected at their inner ends with brackets or lugs on the pipe 53 and at their outer ends are adjustably connected with the intermediate portions of forks 76. The upper ends of the said forks are pivotally mounted upon the pins 74 and the lower ends of the said forks are adapted to operate adjacent the outer edge portion of the receiving opening 54 in the pipe section 53. The forks, of course, work against the stack, so that they tend to exert an outward pull upon the innermost pipe section, which aids in holding the pipe sections in their extended positions, and, as the sections will be disposed at a point above the top of the threshing machine sufficient to clear the top of an ordinary stack, no difficulty will be experienced in extending the sections or maintaining the same in their extended position. As the material is fed from the stack and the height of the same decreases, the weight of the several sections will tend to cause them to gravitate outwardly, so that there will be no liability of the pipe to collapse. A bracket 78 is mounted upon the elbow member 36. Idle pulleys 79 are journaled in horizontal positions at the upper end of the bracket 78. A standard 80 is supported at its lower end upon the shaft 8 and extends up along the side of the fan housing 4. A shaft 81 is located at the upper end of the standard 80 and pulleys 82, 83, 84 and 85 are journaled upon the said shaft 81. A pulley 86 is fixed to the end portion of the shaft 8. A weight 87 is provided with a frame 88 in which is journaled pulleys 89 and 90. A continuous rope belt 91 is trained around the pulley 86, thence over the pulley 84, thence down and under the frame pulley 89, thence up and over the pulley 85, thence down and under the frame pulley 90, thence up and over the pulley 82, thence around the uppermost idler 79, thence around the pulley 77 on the shaft 72, thence back and around the lowermost idler 79, thence over the pulley 83 back to the pulley 86. Therefore it will be seen that means is provided for transmitting rotary movement from the shaft 8 to the shaft 72, and as the said shaft 72 rotates the disk 73 carried thereby is also rotated which in turn will swing the forks 76 upon the links 75 so that the lower ends of the said forks move toward the receiving inlet opening 54 of the pipe section 53. As the pipe sections 51, 52 and 53 are moved longitudinally the weight 87 will take up the slack in the belt 91 so that the said belt at all times will be maintained sufficiently tight to rotate the pulleys around which it passes. Therefore it will be seen that a pneumatic feeder for a thresher or separator is provided, the parts of which are susceptible to a great variety of adjustment so that the receiving opening of the feeder may be properly positioned at a desired part of the stack. Also the forks automatically feed the straw and grain toward the receiving opening of the feeder. After the straw and grain is passed through the fan casing the blast of air is permitted to escape without passing into the body of the thresher or separator, and consequently the air which conveys the material to the thresher does not interrupt or interfere with the blast of air discharged from the fans of the separator within the body of the same to effect the separation of the grain from the straw and chaff.

When it is desired to move the thresher or separator from point to point the pipe sections 51, 52 and 53 may be telescoped within each other and within the pipe section 50, and the said section 50 with the parts contained therein may be swung around over the body of the thresher or separator and thus the presence of the feeder upon the body of the thresher does not present obstruction nor hinder the easy and ready transportation of the machine from point to point.

The object in providing two fans in the fan housing 4 at the opposite sides thereof is that in drawing the grain from the stack a bunch of straw might lodge against the opening of one of the fan compartments, thereby cutting off the intake current to that fan, but the other fan will continue to draw and the material drawn in by the blast from the last mentioned fan will dislodge the material choked against the opening of the compartment of the other fan and will force the same down into the distributer. Again one fan has a tendency to feed the material toward one end of the cylinder and the other fan has a tendency to feed the material toward the other end of the cylinder. Therefore the material is partially distributed by the co-action of the duplicate fans.

Having thus described the invention, what is claimed as new is:

1. A feeder comprising a housing, a series of pipe sections located one within the other, said series being mounted upon the housing for vertical swinging movement and for horizontal turning movement, a bracket carried at the outer end of the inner pipe section, a shaft journaled in the bracket, a disk carried by the shaft, a fork pivoted at the outer end of the inner pipe section and operatively connected with the disk, and means for operating the shaft.

2. A feeder comprising a series of pipe sections located one within the other and mounted for vertical swinging movement and horizontal turning movement, gear teeth mounted upon the innermost pipe section, a bracket mounted upon the outermost pipe section, an arm pivoted to the bracket, a gear wheel journaled upon the arm and adapted to engage the teeth upon the pipe section, means for rotating the gear wheel and means at the outer end of the innermost pipe section to deliver material to said pipe section.

3. A feeder for threshing machines comprising a series of telescopically fitted tubes provided with alined racks on their upper sides, a pinion mounted on the outer tube in position to engage said racks, means for rotating said pinion, and means for causing the racks to successively engage the pinion.

4. A feeder for threshing machines comprising a series of telescopically fitted tubes provided with alined racks on their upper sides, a pinion mounted on the outer tube in position to engage said racks, means for rotating said pinion, and inter-engaging means on the tubes whereby the projecting movement of the innermost tube will be transmitted to the outer tubes successively.

5. A feeder for threshing machines comprising a series of telescopically fitted tubes provided with alined racks on their upper sides, a pivotal support mounted on the outer tube, a pinion carried by said support, means for rotating said pinion, and means acting on the support to hold the pinion to said racks.

6. A feeder for threshing machines comprising a series of telescopically fitted tubes provided with alined racks on their upper sides, a pinion mounted on the outer tube in position to engage said racks, means for rotating said pinion, a roller mounted on the inner end of each inner tube and riding upon the next adjacent outer tube, and an internal stop on each outer tube near the outer end thereof in the path of the roller on the adjacent inner tube.

In testimony whereof, I affix my signature in presence of two witnesses.

GUFF LOGIN LASLEY. [L. S.]

Witnesses:
 T. A. WATSON,
 M. H. WOOD.